United States Patent [19]

Karlow et al.

[11] Patent Number: 5,660,414
[45] Date of Patent: Aug. 26, 1997

[54] SIDE IMPACT HEAD RESTRAINT SYSTEM

[75] Inventors: James Peter Karlow, Milford; Mohamed Boumarafi, Rochester Hills; Jonathan Paul Hurford, Lake Orion, all of Mich.

[73] Assignee: Takata Inc., Auburn Hills, Mich.

[21] Appl. No.: 552,071

[22] Filed: Nov. 2, 1995

[51] Int. Cl.⁶ ............................................ B60R 21/08
[52] U.S. Cl. ....................... 280/749; 280/753; 180/274; 60/635
[58] Field of Search .......................... 280/749, 753, 280/748, 730.2, 730.1, 806; 180/274, 282; 60/635, 632; 403/329, 326

[56] References Cited

U.S. PATENT DOCUMENTS

| | | | |
|---|---|---|---|
| 1,572,003 | 2/1926 | Fleming | 403/329 |
| 2,240,330 | 4/1941 | Flagg et al. | 403/326 |
| 3,037,809 | 6/1962 | Praha | 280/753 |
| 3,687,485 | 8/1972 | Campbell | 280/749 |
| 3,831,975 | 8/1974 | Mednikow | 280/749 |
| 3,953,049 | 4/1976 | Surace et al. | 280/730.1 |
| 4,860,698 | 8/1989 | Patrichi et al. | 60/635 |
| 4,946,191 | 8/1990 | Putsch | 280/730.2 |
| 4,966,388 | 10/1990 | Warner et al. | 280/730.1 |
| 5,033,236 | 7/1991 | Szerdahelyi et al. | 280/730.2 |
| 5,161,821 | 11/1992 | Curtis | 280/730.2 |
| 5,265,903 | 11/1993 | Kuretake et al. | 280/730.2 |
| 5,282,648 | 2/1994 | Peterson | 280/733 |
| 5,322,322 | 6/1994 | Bark et al. | 280/730.2 |
| 5,324,072 | 6/1994 | Olson et al. | 280/730.2 |
| 5,333,898 | 8/1994 | Stutz | 280/730.2 |
| 5,333,899 | 8/1994 | Witte | 280/730.2 |
| 5,362,097 | 11/1994 | Barske | 280/730.1 |
| 5,366,241 | 11/1994 | Kithil | 280/735 |
| 5,439,247 | 8/1995 | Kolb | 280/730.2 |
| 5,462,308 | 10/1995 | Seki et al. | 280/749 |

FOREIGN PATENT DOCUMENTS

| | | | |
|---|---|---|---|
| 2628815 | 1/1978 | Germany. | |
| 4307175 | 9/1993 | Germany. | |
| 5-139232 | 6/1993 | Japan. | |
| 962946 | 7/1964 | United Kingdom | 280/749 |
| 2191450 | 12/1987 | United Kingdom. | |
| 93/09977 | 5/1993 | WIPO | 280/749 |

*Primary Examiner*—Brian L. Johnson
*Assistant Examiner*—Peter C. English
*Attorney, Agent, or Firm*—Harness, Dickey & Pierce, PLC

[57] ABSTRACT

A vehicle side impact restraint system especially adapted for providing head impact protection. The system employs a deployable restraint curtain which is maintained stowed in an undeployed condition within a slot along the upper edge of a vehicle side door window. A track assembly is vertically mounted along the rear edge of the window and includes a gas generator, a track, and a sliding projectile. The upper edge of the triangularly shaped curtain is attached to the vehicle whereas the rear end of the lower edge is mounted to the projectile. Upon deployment, the sliding projectile pulls the curtain to a downward position in response to a deployment signal sent to the gas generator. The projectile reaches the lower end of the track where it is locked in position thus stretching the curtain across a portion of the window area, thus providing a surface for impact energy absorption.

6 Claims, 3 Drawing Sheets

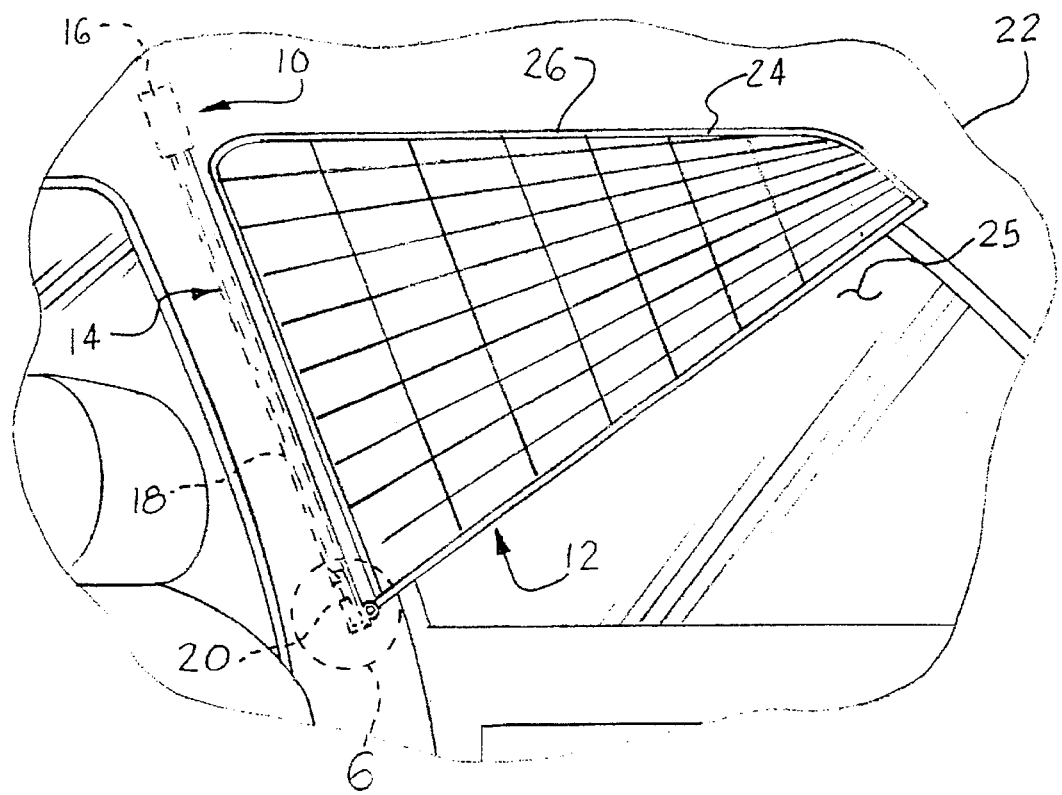
FIG-3
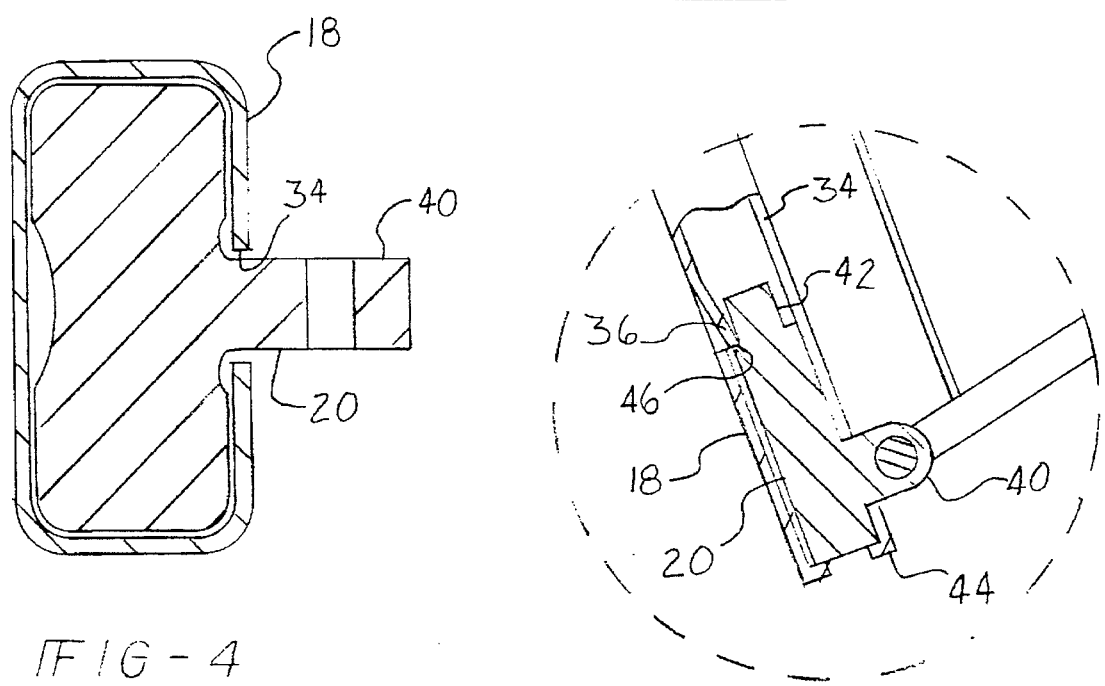
FIG-4
FIG-6

SIDE IMPACT HEAD RESTRAINT SYSTEM

BACKGROUND AND SUMMARY OF THE INVENTION

This invention relates to a motor vehicle safety device, and particularly, to a deployable restraint system especially adapted for providing side impact protection for the head of a vehicle occupant.

In the past several decades, automotive manufacturers have made great strides in enhancing the safety of motor vehicles in terms of impact protection. While seat belt systems provide a high degree of occupant impact protection, deployable impact protection devices such as inflatable air bags are now in commonplace use in motor vehicles. Air bags for the driver and passenger-side front seat occupants are commonly found in vehicles today. Until recently, the primary attention in the design of deployable restraints was directed toward providing frontal impact protection.

Motor vehicle manufacturers and their suppliers of safety systems are increasingly focussing on deployable devices for providing side impact protection. Statistically, side impacts pose a greater probability of causing significant occupant injury as compared with frontal impacts. This difference is largely due to the limited energy absorption structure available in side impact situations, especially for the "on-side" occupant. In response to this concern, vehicle manufacturers and suppliers are developing side impact air bags which are mounted either to the door or body pillar structure, or to the seat back of the occupant seat. In response to a signal from a crash sensor an inflator generates gas. The expanding gas fills a woven fabric air bag which fills an area between the door and occupant. To date, the primary emphasis for deployable side impact devices has been protecting the torso and pelvic area of the occupant. Providing head protection for side impact poses a number of design challenges beyond that posed for torso and pelvic protection. In the case of a side impact air bag for torso and pelvic protection, the door structure acts as a "reaction plate" to support the air bag as it is compressed by the occupant thus providing energy absorption. In the head area, a convenient reaction plate surface is not present. This is the case since the side door window is moveable and thus can be in the down position during impact and is made of a brittle material. Accordingly, the window cannot be relied upon as a reaction plate for an air bag.

One approach toward resolving the above referenced difficulties for side impact head protection is to provide a deployable fabric shade or curtain tied to the door frame which provides an instantaneous support structure for an air bag or deployable safety curtain. After detection of a side impact crash, the system pulls down a curtain which covers the upper portion of the side door window. In one design of such device the deployment mechanism incorporates a pyrotechnically powered actuator coupled to a wire and pulley system to pull down the curtain from its non-deployed stored state to a deployed condition. Although such a system appears workable, it is believed to be difficult to incorporate it into a vehicle structure.

In motor vehicle design today, size and mass constraints are of critical importance. This is especially true for the side frame area of an automobile body where there is very tight packaging space. In order to be cost effective, the design of a deployable side impact restraint device should be applicable across many vehicle platforms and provide low cost fabrication and assembly, with high quality and reliability.

In accordance with this invention, a side impact head restraint system is provided which is believed to provide the above mentioned desirable attributes. The restraint system of this invention incorporates a pyrotechnic gas generator mounted to an end of a channel type track. A sliding projectile moves along the track and forms an anchorage for a deployable curtain. When initiated, the gas generator propels the sliding projectile along the track, which pulls the deployable curtain from a stowed condition to a deployed condition. A locking mechanism anchors the sliding projectile in the downward deployed condition, thus maintaining the curtain in a deployed state. The deployed curtain is able to restrain loadings caused by the occupants head bearing against it, and thus is believed capable of reducing the severity of head injuries in some side impact crash conditions.

Further objects, features and advantages of the invention will become apparent from a consideration of the following description and the appended claims when taken in connection with the accompanying drawings.

BRIEF DESCRIPTION OF THE DRAWINGS

FIG. 3 is an interior side view of a vehicle car door area similar to FIG. 1 but showing the deployable curtain restraint system of this invention in a fully deployed condition.

FIG. 4 is a cross-sectional view taken along lines 4—4 of FIG. 1 showing, in particular, the track assembly and sliding projectile elements.

FIG. 6 is a partial enlarged and cut-away view showing the lower portion of the deployable curtain restraint system of the invention showing the sliding projectile in a downward deployed condition.

DETAILED DESCRIPTION OF THE PREFERRED EMBODIMENT

Figure 1:
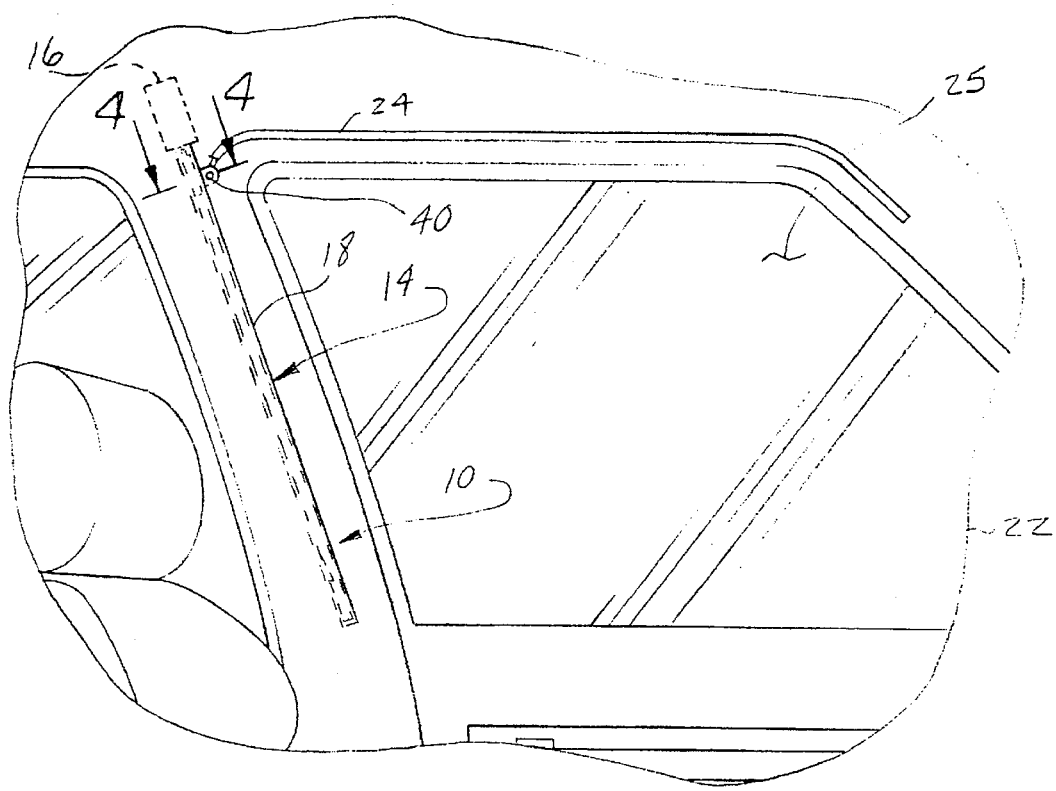
FIG. 1 is an interior side view of a vehicle car door area having a deployable curtain restraint system in accordance with this invention shown in a non-deployed condition.
Figure 2:
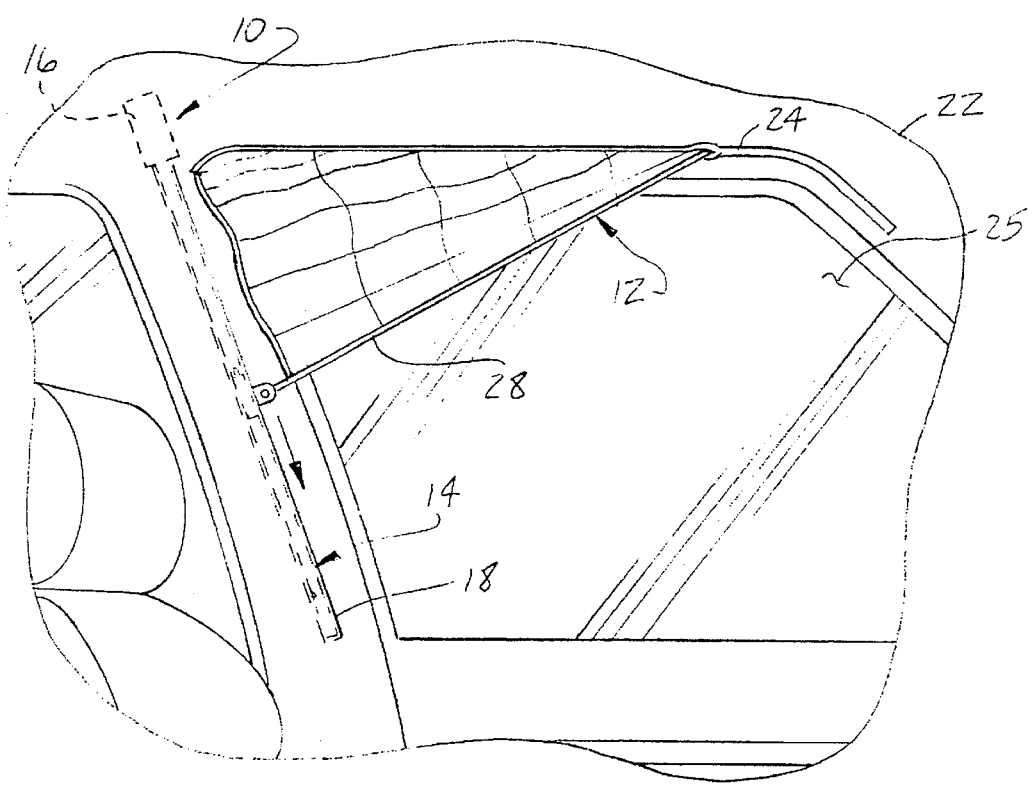
FIG. 2 is an interior side view of a vehicle car door area like FIG. 1 but showing the deployable curtain restraint system in a partially deployed condition.

A deployable curtain restraint system in accordance with this invention is shown in its entirety with reference to FIGS. 1 through 3, and is generally designated by reference number 10. Restraint system 10 principally comprises restraint curtain 12, and track assembly 14 which includes gas generator 16, track 18, and sliding projectile 20.

As shown in the Figures, restraint system 10 is mounted within the interior of a motor vehicle 22. As shown, vehicle 22 has a side door 23 with a window area 25. Restraint curtain 12 is retained within an elongated slot 24 which runs along the door upper frame member or the roof rail over the door. Track assembly 14 is in turn mounted to either the vehicle "B" pillar as shown, or to the door frame. Preferably, track assembly 14 would be hidden from view behind a trim panel until the system is deployed.

Restraint curtain 12 can be made of various materials. For example, the commonly used nylon or polyester woven fabric used to make vehicle impact protection air bags could be implemented. Curtain 12 could also be made in the form of a net made from woven yarn such as shown in the FIGS. 2 and 3. Restraint curtain 12 is generally triangular in shape with an upper edge 26 which is anchored to the vehicle structure within slot 24. A restraint curtain lower edge 28 is reinforced with a heavy cord or other tensile member with its forward end mounted to the vehicle within slot 24 and a free rearward end.

Figure 5:
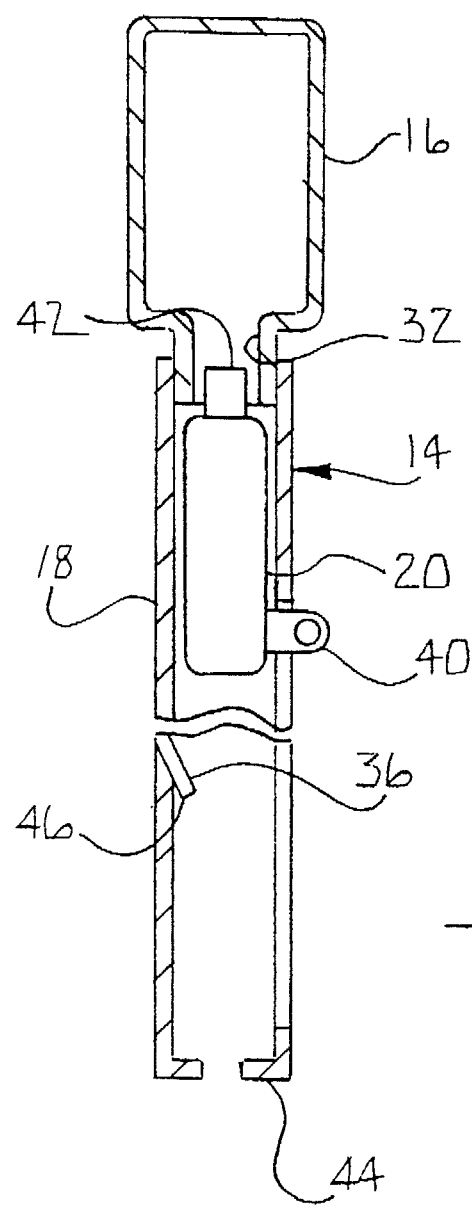
FIG. 5 is a partially enlarged and cut-away view of the deployable curtain restraint system showing particularly the gas generator, sliding projectile, and track assembly elements.

As best shown in FIG. 5, track assembly 14 includes gas generator 16 which can be of the compressed gas, pyrotechnic or hybrid variety. Gas generator 16, when initiated, emits a volume of gas for deploying the system as will be explained in more detail below. Gas generator 16 is mounted to the upper end of track 18 and includes a discharge nozzle 32 aimed in a downward direction. Track 18 has a generally rectangular configuration as best shown in FIG. 4, having a longitudinal open slot 34 and thus the track forms a generally "C"-shaped cross sectioned shape. The upper end of track 18 is however, fully enclosed over a short distance and thus slot 34 terminates before the upward end of track 18. Adjacent the lower end of track 18, inwardly deflected tooth or ramp 36 is provided which is formed from a locally deflected section of the wall of track 18.

Sliding projectile 20 has an exterior configuration to closely conform but freely slide within track 18 as shown in FIG. 4. In addition, sliding projectile 20 features a protruding attachment ear 40 to which the rearward end of restraint curtain lower edge 28 is attached. Projectile 20 also features a reduced diameter pin 42 at its upper end which closely conforms to the inside bore of gas generator discharge nozzle 32.

FIGS. 1 and 5 show restraint system 10 in an undeployed condition. In this condition, system 10 is hidden such that it is not obvious to the vehicle occupant during normal operation. As mentioned previously, track assembly 14 and slot 24 can be hidden behind a trim cover. Track assembly 14 and slot 24 can be covered by trim which is designed to open allowing curtain 12 to be pulled out for deployment.

In the event that a side impact crash is detected, a signal is directed to gas generator 16 causing it to emit an explosive discharge of gas. This discharge propels sliding projectile 20 in a downward direction in a forceable manner, akin to a rifle bullet being shot through a barrel. In the case of restraint system 10, however, sliding projectile 20 is propelled by gas pressure over a short distance since a gas leakage path is presented by track slot 34. Depending on numerous design factors, the distance of gas pressure propulsion may only be the distance that pin 42 extends into generator discharge nozzle 32, thus providing a short barrel. In other cases, gas pressure may continue to propel projectile 20 at least a short distance along track 18, until venting occurs through slot 34. The momentum of projectile 20 carries it to the downward position. As projectile 20 moves downward along track 18 it pulls with it restraint curtain lower edge 28 thus pulling restraint curtain 12 from its stowed condition within slot 24. When projectile 20 reaches the lower end of track 18 it is prevented from discharging from the track by contact with track end 44. Projectile 20 is maintained in this position by engagement with ramp 36. As projectile 20 engages ramp 36 the ramp deflects allowing the projectile to move past the ramp. Once past, ramp 36 springs back to its normal position, thus blocking projectile 20 from moving upwardly due to contact between ramp end surface 46 and the projectile. In this position, restraint curtain 12 stretches across the window opening and thus the curtain is in a position to absorb impact loads from the occupant's head.

It is to be understood that the invention is not limited to the exact construction illustrated and described above, but that various changes and modifications may be made without departing from the spirit and scope of the invention as defined in the following claims.

We claim:

1. A restraint system for providing side impact protection for a motor vehicle occupant and adapted to be mounted to the vehicle adjacent the window area of a side door of the vehicle, comprising:

a restraint curtain having an upper edge affixed to said vehicle along the upper perimeter of said window area and having a lower edge having one end affixed to said vehicle and a second opposite end;

a track mounted in a generally vertical orientation adjacent said window area and having a first end and a second end, said track having a longitudinal open slot extending between said first end to said second end, said track having a deflectable latching means adjacent said second end;

a gas generator mounted to said track for generating gas in response to a crash signal and having a gas discharge nozzle; and a sliding projectile having a first end proximate said discharge nozzle and being moveable along said track and affixed to said restraint curtain second end, said projectile maintained in a position adjacent said gas generator at said first end of said track in a normal non-deployed condition with said curtain in a folded condition and wherein, in response to said crash signal, said gas generator generates gas discharging through said discharge nozzle thereby creating a gas pressure, said gas pressure causing said projectile to be propelled over a portion of said track, which is substantially less than the length of said track, until venting of said gas pressure occurs through said open slot, whereby said projectile travels along a remaining portion of said track to said second end only by the momentum imparted upon said projectile by said gas pressure, thereby pulling said curtain into a deployed condition covering at least a portion of said window area, said projectile engaging said deflectable latching means thereby maintaining said projectile at said second end, thus providing restraint for said occupant.

2. A restraint system according to claim 1 wherein said track has a generally "C" shaped cross-sectional configuration having, said open slot along at least a portion of its length, and said sliding projectile being confined to slide within said track and having an attachment ear extending through said slot and being affixed to said curtain second end.

3. A restraint system according to claim 1 wherein said deflectable latching means comprises a ramp formed by said track and oriented to be contacted and deflect by said sliding projectile as said projectile travels along said track toward said second end and having an end surface which contacts said projectile to prevent movement of said projectile to said first end in response to restraint loads acting on said curtain.

4. A restraint system for providing side-impact protection for a motor vehicle occupant and adapted to be mounted adjacent the window area of the side door of the vehicle comprising:

a restraint curtain of generally triangular shape having an upper edge affixed to said vehicle along an upper perimeter of said window area and having a lower edge having one end affixed to said vehicle and a second opposite end;

a track mounted in a generally vertical orientation adjacent a rear edge of said window area, said track having an upper end and an opposite lower end;

a gas generator mounted at said upper end of said track for generating gas in response to a crash signal and having a gas discharge nozzle;

a sliding projectile proximate said discharge nozzle and being movable along said track and affixed to said restraint curtain second end, said projectile maintained in an upper position adjacent said gas generator at said upper end of said track in a normal non-deployed condition with said curtain in a folded condition and wherein, in response to said crash signal, said gas generator generates gas which propels said projectile over a portion of the length of said track said projectile being propelled over a remaining portion of said track only by the momentum imparted upon said projectile by said gas, said projectile traveling downwardly along said track to said opposite lower end thereby pulling said curtain lower edge second end thereby pulling said restraint curtain into a deployed condition covering at least a portion of said window area thus providing restraint for said occupant; and deflectable latching means adjacent said track lower end for maintaining said sliding projectile at said lower end in said deployed condition.

5. A restraint system according to claim 4 wherein said track has a generally "C" shaped cross-sectional configuration having an open slot along at least a portion of its length, and said sliding projectile being confined to slide within said track and having an attachment ear extending through said slot and being affixed to said curtain lower edge second end.

6. A restraint system according to claim 4 wherein said deflectable latching means comprises a ramp formed by said track and oriented to be contacted and deflected by said sliding projectile as said projectile travels downwardly along said track toward said lower end and having an end surface which contacts said projectile to prevent movement of said projectile to said upper end in response to restraint loads acting on said curtain.

* * * * *